United States Patent [19]
Burgess

[11] 3,973,930
[45] Aug. 10, 1976

[54] DRILLING MUD DEGASSER APPARATUS AND METHOD

[76] Inventor: Harry L. Burgess, 5400 Memorial Drive, Apt. 511, Houston, Tex. 77007

[22] Filed: June 21, 1974

[21] Appl. No.: 483,935

Related U.S. Application Data

[63] Continuation-in-part of Ser. No. 404,399, Oct. 9, 1973, abandoned.

[52] U.S. Cl. .................................. 55/41; 55/52; 55/55; 55/190; 55/203
[51] Int. Cl.² .................................. B01D 19/00
[58] Field of Search ............ 55/41, 52, 55, 190–193, 55/203, 406, 409; 233/20 R, 27, 28, 47 R, 16, DIG. 1

[56] References Cited
UNITED STATES PATENTS

| | | | |
|---|---|---|---|
| 2,489,678 | 11/1949 | Sharples | 233/28 |
| 2,704,658 | 3/1955 | Gordon | 55/203 X |
| 3,055,743 | 9/1962 | Anderson | 55/193 X |
| 3,244,360 | 4/1966 | Green | 233/28 X |
| 3,271,929 | 9/1966 | Bowden et al. | 55/203 X |
| 3,768,726 | 10/1973 | Hale et al. | 233/16 |
| 3,856,483 | 12/1974 | Rumpf et al. | 55/52 X |

*Primary Examiner*—Charles N. Hart
*Assistant Examiner*—Richard W. Burks
*Attorney, Agent, or Firm*—Bertram H. Mann

[57] ABSTRACT

A drilling mud degasser apparatus which has only a single moving part, namely, a unitary, hollow body rotatable within an open bottom casing, and the impeller of a suction pump connected to the interior of the rotor body. The casing and rotor are submerged in a pond of mud returned from a well or connected in a return mud line such that gas-cut mud entering the bottom of the rotor body is centrifugally thrown upwardly and outwardly to cause the liquid and/or sand components to travel up the wall of the rotor body and be discharged through outlet openings at the top of the body wall. Concurrently, released gases are drawn through inner gas outlets, at the top of the rotor body into the impeller housing and thence discharged. Differential discharge of sand and liquid components by centrifugal action may be provided as may a flotation collar for insuring uniform submersion of the casing beneath the liquid level.

30 Claims, 9 Drawing Figures

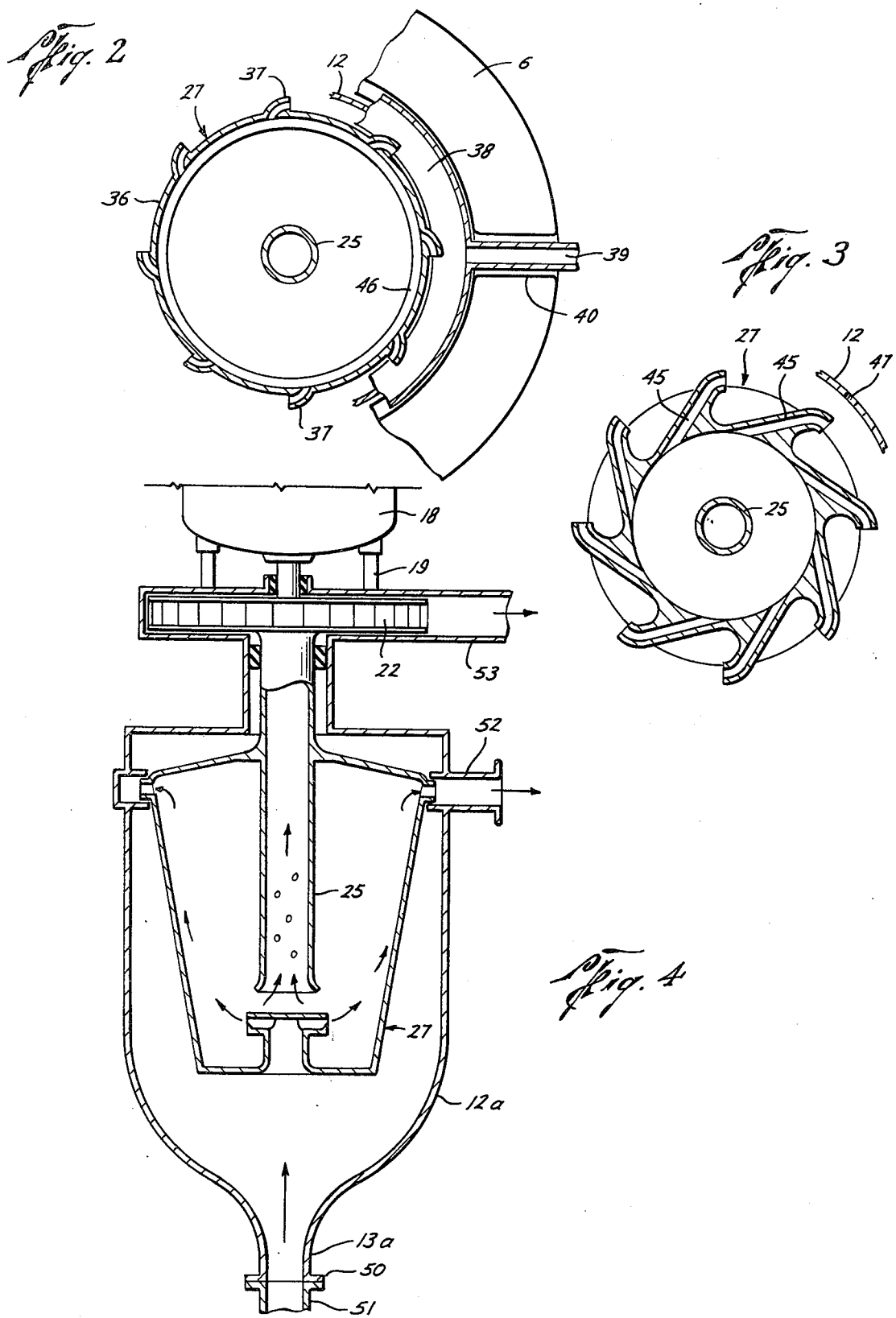

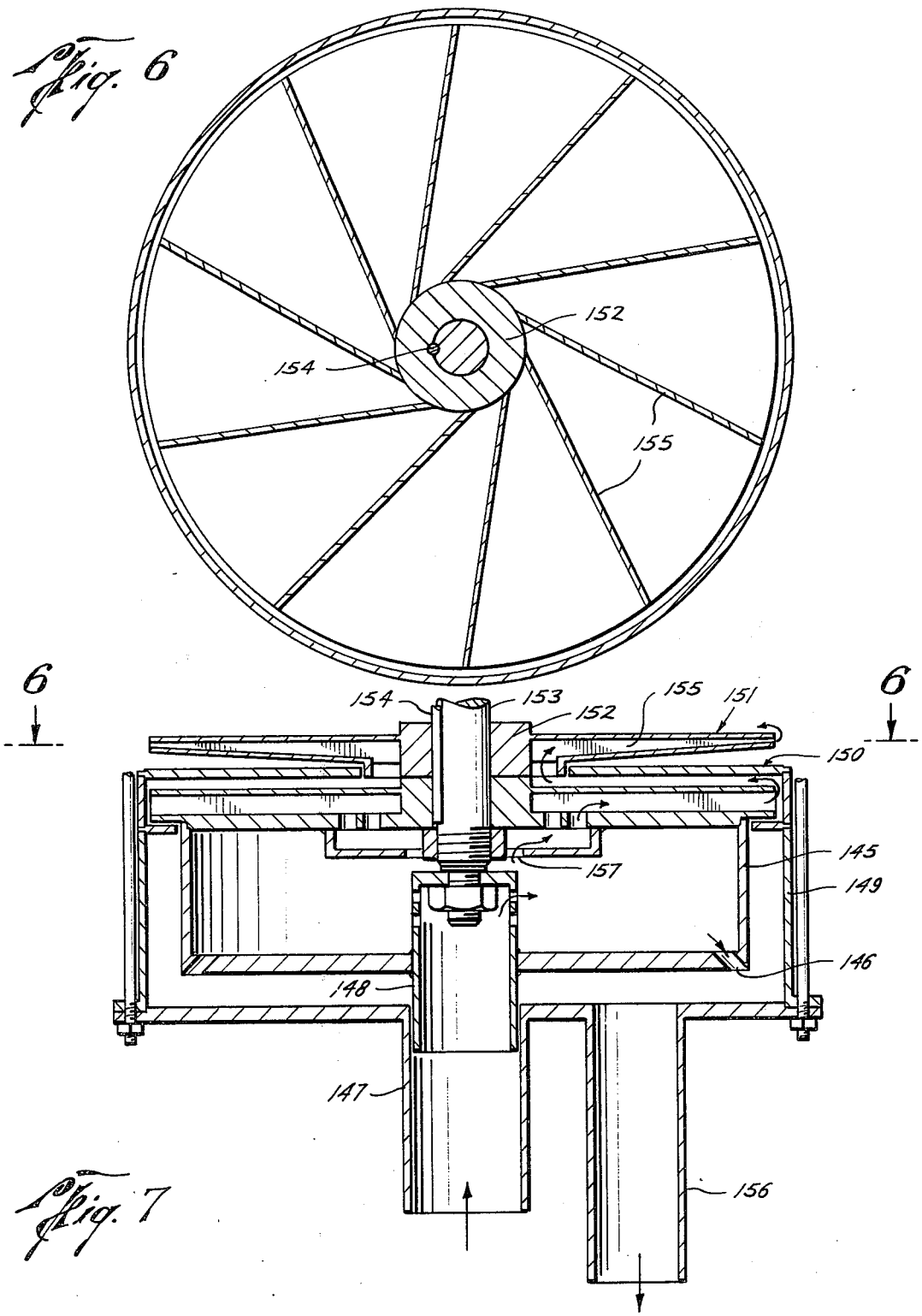

DRILLING MUD DEGASSER APPARATUS AND METHOD

RELATED APPLICATION

This application is a continuation in part of an application Ser. No. 404,399 filed Oct. 9, 1973 now abandoned.

BACKGROUND OF THE INVENTION

This invention relates to centrifugal separation equipment and, particularly, to degassers and desanders for used drilling mud.

The drilling mud which is pumped into a well during drilling frequently is returned to the surface carrying dissolved or suspended gases as well as sand and cuttings all of which must be removed from the mud before it can be safely fed back into the well. The apparatus heretofore provided for this purpose frequently is complicated, expensive, and bulky and requires piping for leading the gas-cut mud from the collection tank to the degasser unit and thence back to a clean mud tank. For instance, conventional drilling mud degasser units weigh as much as 6,000 lbs. and have multiple moving parts, such as a vacuum pump, a mud transport pump, floats, and switches. Futhermore, such equipment, because of its bulk, usually must be individually erected at the well site.

Accordingly, it is an object of the present invention to provide a drilling mud degasser apparatus which is very much simplified, less bulky and less expensive than previous devices for a similar purpose and which, nevertheless, is even more efficient than such devices.

Another object is to provide degasser apparatus having only a single movable part.

Another object is to provide such apparatus including a rotor body so arranged as to avoid the necessity of a separate stirring element to eliminate caking of mud on the equipment.

Another object is to provide such a degasser having greater separating capacity due to the application of centrifugal as well as suction separating forces.

Another object is to provide such a degasser which is relatively mobile so as to be adapted for mounting with existing mud systems, either in or connected to a contaminated mud tank or in a return mud pond.

Another object is to provide a degasser device which operates uniformly submerged in a tank or pond of gascut mud.

Still another object is to provide a degasser which incorporates desanding means.

SUMMARY OF THE PRESENT INVENTION

The present invention comprises a casing for submergence in a tank or pond of gas-cut mud or other liquid, or for connection to a pipeline containing such mud or liquid. A hollow rotor body is rotatably mounted within the casing and a centrifugal blower is mounted above the casing and with its inlet connected to the interior of the rotor body. The blower impeller or impellers and the rotor body are rotated as a unit by a motor, conveniently mounted on top of the impeller casing. A liquid inlet is provided at the bottom of the rotor body. During rotation of the rotor body, the liquid and suspended solids are centrifugally thrown outwardly and upwardly and discharged through peripheral outlet ports, while the released gas is sucked into the blower and thence discharged outwardly of the apparatus. The casing may be supported by a flotation collar or otherwise for maintaining the apparatus at substantially uniform submersion, or may rest on a platform.

BRIEF DESCRIPTION OF THE DRAWINGS

In the accompanying drawings which illustrate the invention,

FIGS. 2 and 3 are detail horizontal sections taken substantially on the corresponding section lines of FIG. 1.

FIG. 4 is a vertical transverse section illustrating a modification.

FIG. 6 is a horizontal section taken on line 6—6 of FIG. 7.

FIG. 7 is a partial vertical transverse central section illustrating still another modification.

DETAIL DESCRIPTION OF DRAWINGS

Figure 1:
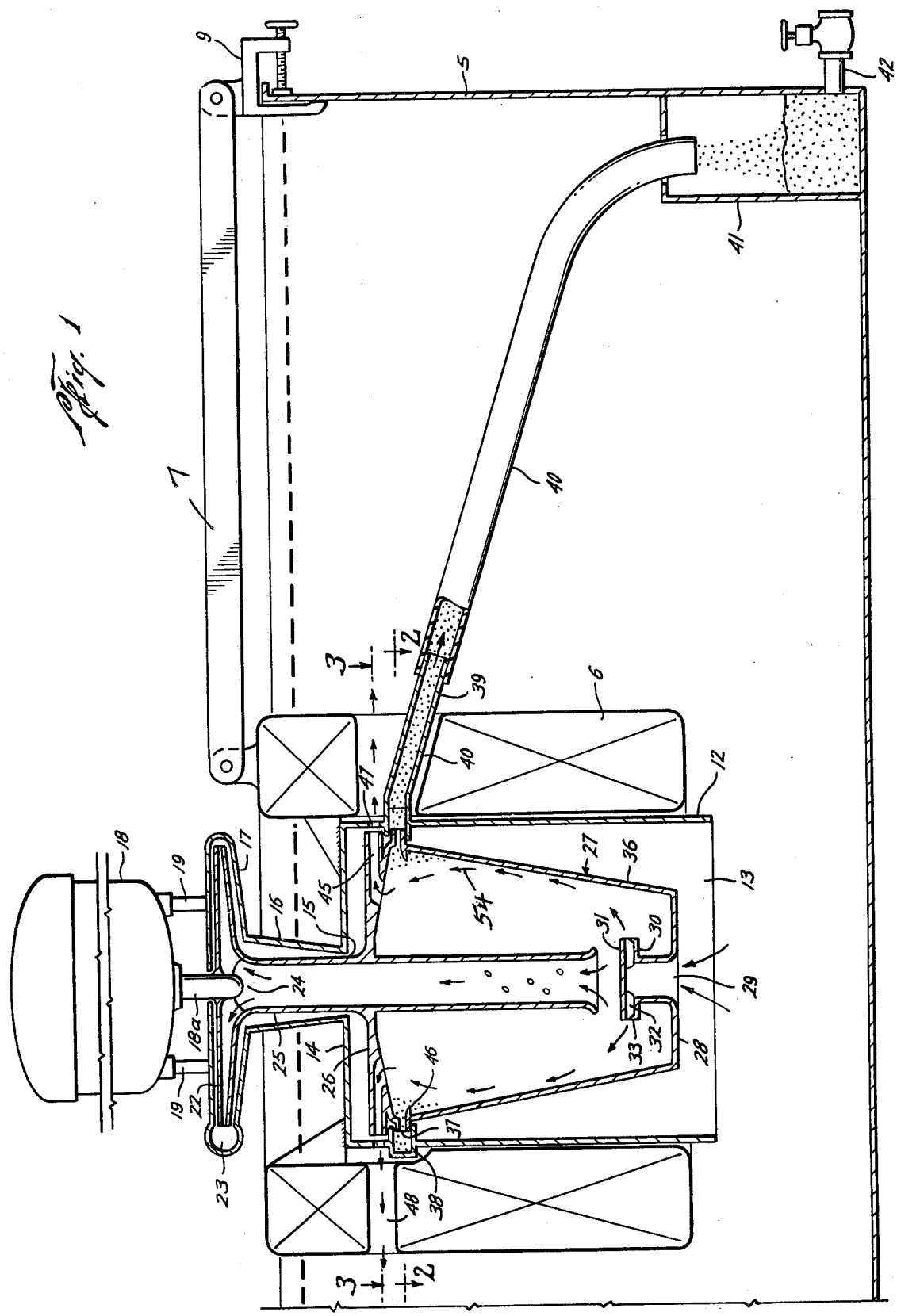
FIG. 1 is a vertical section through an exemplary form of the apparatus installed as in a contaminated drilling mud tank.

FIG. 1 shows a mud tank 5 of the type customarily provided at a well drilling site, suitable connections being provided for receiving the gas-cut mud and delivering conditioned mud to the clean mud tank preparatory to reinjection into the well during the drilling operation. An annular flotation collar 6 within the tank is pivotally connected to a link 7 clamped at 9 to the upper edge of the tank wall. Mounted and supported within the flotation collar is a casing 12 having an open bottom 13 and a top 14 with a central opening 15 from which projects upwardly a neck 16. Mounted on neck 16 is a toroidal blower housing 17 on top of which, in turn, a motor 18 is mounted on legs 19.

The blower impeller 22 is sealingly secured to and carried by the motor shaft 18a. The impeller is of any desired type and discharges, in the present instance, peripherally into the toroid outlet 23 and thence to a collection point or into the atmosphere. The impeller has a central bottom inlet 24 from which depends a tube 25 extending through and secured to top wall 26 of the hollow rotor body 27. Body 27 has a bottom 28 with a central inlet 29 having an annular shelf portion 30 upon which a top plate 31 is supported by radial or helical vanes 32. At the outer edge of shelf portion 30 there is provided an annular sharp-edge rib 33 between which and plate 31 a narrow egress passage is provided. The wall 36 of the rotor body extends upwardly and outwardly from bottom 28, as shown, but may be cylindrical or otherwise shaped. Substantially at the intersection between side wall 36 and top 26 of the rotor there are provided annularly disposed, downstream facing vents, as at 37 in FIG. 2, which serve to discharge sand and cutting chips centrifugally driven upwardly along wall 36, as will be explained. This solid material is discharged into the open face of a three-sided ring 38 carried by casing 12 and thence is led by piping 39, passing through an opening 40 in the flotation collar 6, and a hose 40 to a collection box 41 from whence the collected material may be washed out from time to time through a valved outlet 42.

Formed on rotor body top 26 are annularly arranged downstream facing vents, as at 45 (FIG. 3), which are located above outlet vents 37 and closer to the axis of the rotor body, for discharge of the lighter liquid component in the rotating body. A lip or lips 46 may be necessary along the bottoms of lower discharge openings 37. Vents 45 may discharge into the top of casing 12 which is provided with holes 47 communicating with openings 40 and 48 in the flotation collar.

The form in FIG. 4, while operating similarly to that in FIG. 1, is designed for inclusion in a pipeline through which the gas-cut mud or other liquid flows. Casing 12a has a reduced lower inlet opening 13a provided with a flange 50 for attachment to a flanged mud inlet pipe 51. The outlet pipe for clean mud is shown at 52, while the impeller casing discharges the released gas through a pipe 53. No provision is made in this form for separate discharge of sand and cutting, although, obviously, this feature could be added, as in FIG. 1.

Figure 5:
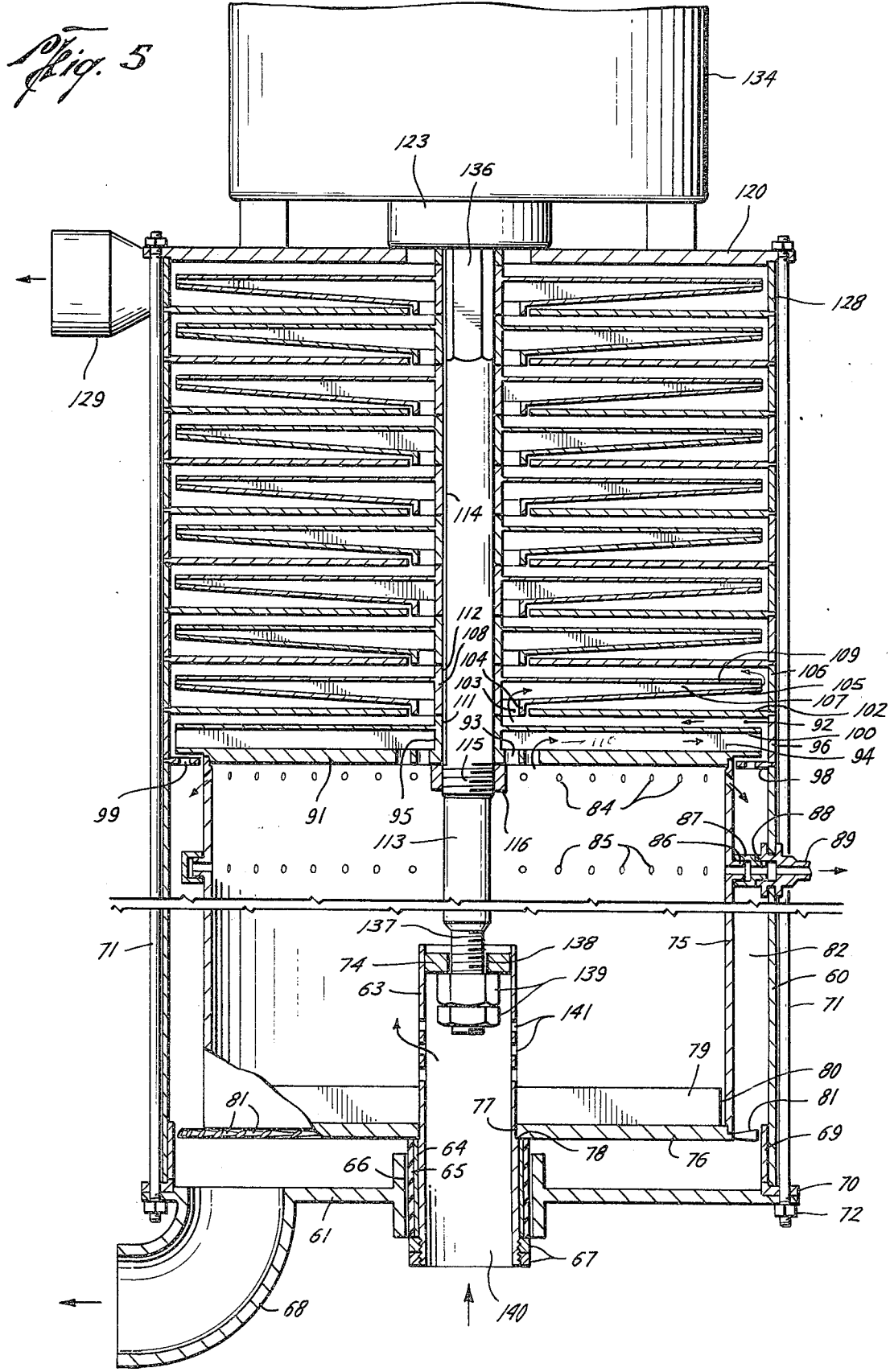
FIG. 5 is a vertical center section illustrating another modification.

The form in FIG. 5 has several refinements added for still better separation of gases from the liquid and suspended solids in gas-cut drilling mud. The casing 60 may be adapted for support by a flotation collar, as in FIG. 1, or may rest upon a suitable platform or other stationary support. The bottom plate 61 of the casing has a central journal bearing sleeve 62 within which is rotatably received the lower extremity of an inlet pipe 63 having inlet facing 64 and a sealing bushing 65. A slight clearance is provided at 66 for admitting between the bearing parts a thin sheet of ambient fluid. Pipe 63 has a threaded lower extremity for receiving nuts 67 which bear against the bottoms of the rotating bearing part 64 and 65, and a top plug 74 with an aperture 138. At the left side of bottom plate 61 there is shown the exit pipe 68 for the degassed mud. A collar 69 extends around the inner wall of the casing at the bottom and has welded to its bottom edge an outwardly extending flange 70 with perforations for receiving long bolts 71 with nuts 72 for securing casing bottom plate 61 in position, as will be explained.

The rotating hollow body, in this instance, has a cylindrical side wall which, as stated, could be of any suitable shape, for instance, frusto conical, as in FIG. 1, or paraboloid in vertical section. A plate 76 forms the bottom of the rotating body and has its outer periphery machined to receive the lower edge of the rotor body side wall. A central orifice 77 in plate 76 is snugly received about inlet pipe 63 and the plate about this orifice rests upon a shoulder 78 in pipe 63. Plate 76 is provided with reinforcing ribs 79 which are welded to the plate and also to inlet pipe 63. The ribs slightly clear the outer wall of the rotating body, as at 80, for releasing liquids upwardly into the interior of the body. Projecting outwardly from bottom plate 76 are the axial flow impeller blades 81 which partially traverse the annulus 82 between casing wall 60 and the outer wall of rotor body 75 for a purpose to be described.

An annular series of holes 84 near the top edge of the side wall of the rotor provides for discharge of solids into annulus 82, the position of the holes being such as to cause the discharged mud to strike against the casing wall 60 for additional degassing effect. Sand discharge openings 85 may be provided in the rotor body side wall somewhat below mud discharge openings 84. These openings may have outwardly extending nipples, as at 86, which rotate within a hollow ring 87 supported from the casing wall by means of a plurality of radial ribs, one of which, as at 88, is hollow and provided with a suitable fitting for connection with a sand discharge pipe 89.

A plate 91 rests upon the upper edge of the rotor wall and forms the top of the rotor. This plate also forms the bottom of the toroidal chamber 92 of a first-stage centrifugal suction pump and has inlet openings 93 leading into the throat of the stage. Formed on the upper surface of plate 91, as by welding, are ribs, as 94, extending radially or tangentially outwardly from an inner ring 95 nearly to the outer annular wall 96 and forming a centrifugal impeller. Plate 91 likewise extends outwardly from inner ring 95. A top plate 100 rests on ribs 93 and closes the impeller passages. The ribs may be welded to plates 91 and 100 and to inner ring 95. Extending across the top of annulus 82 is an annular rib-like wall 98 having gas release holes 99 opening into the toroidal chamber 92.

Resting on the centrifugal first stage is a secondary stage including a horizontal bottom plate 102 with a central inlet orifice 103 in which is secured a throat-forming collar 104. A concave plate 105 extends from collar 104 nearly to outer peripheral wall section 106, aligned with and surmounting first stage peripheral wall 96. Tapered radial or tangential ribs 107 extend along the upper surface of concave wall 105, from an inner ring 108, which rests upon and is coextensive and concentric with lower inner ring 95, to the outer edge of concave plate 105 and nearly to peripheral wall 106. A horizontal plate 109 is welded to the tops of ribs 107 and forms with the ribs and lower plate 105 the second-stage centrifugal impeller passages. Eight additional centrifugal blower devices, similar to the secondary blower just described, are stacked above the latter, so as to multiply the gas separating suction applied to the interior of the rotor body. The path of gases sucked from the rotor body through inlet openings 93 is illustrated by the arrows 110.

The stacked inner rings 95, 108, etc., have aligned central openings 111, 112, etc., which are snugly received upon the axial drive shaft 113. A key 114 is received in complementary keyways in the drive shaft and impeller hubs and drives the impellers. An intermediate portion of the drive shaft is threaded as at 115, and receives a nut 116 for securing the pump. Nut 116 underlies the lowermost inner ring 95 and centrally supports the impellers.

At the top of the uppermost pump stage is the top wall 120 carrying a bearing 123. The entire assembly of the ten centrifugal pump housings and casing wall 60 is firmly secured together by the long vertical bolts 71 extending through apertures in the peripheries of top plate 120 and bottom plate 61. The outer peripheral wall 128 of the top pump stage forms the gas outlet orifice connection 129.

An electric drive motor 134 is supported on top plate 120 and has a splined shaft 136 coupled to the complementary upper extremity of drive shaft 113 thereof. The assembly of inner collars 95, 112, etc., with the impellers is secured together and to rotor body top wall 91, for unison rotation, by nut 116. The threaded lower extremity 137 of the drive shaft 113 extends through orifice 138 in top plug 74 in inlet pipe 63 and carries nuts 139 which support the inlet pipe. Pipe 63 has a bottom inlet 140, for mud to be treated, and egress holes 141.

The degasser unit is assembled by successively stacking the pump stages about inverted drive shaft 113, tightening nut 116 against bottom plate 91, then adding the rotor body 75 and the casing. Inlet pipe 63 is then inserted and nuts 139 and 67 added and tightened.

Finally, nuts 72 are threaded onto long bolts 71 to complete the securement of the assembled parts. Where the desanding function is to be utilized, collection ring 87 with its radial support ribs and connection pipe 88 will be assembled in the annulus between casing 60 and the rotor body. When the assembled unit is placed upright, motor 134 may be added and connected by coupling 136 to drive shaft 113.

Figure 8:
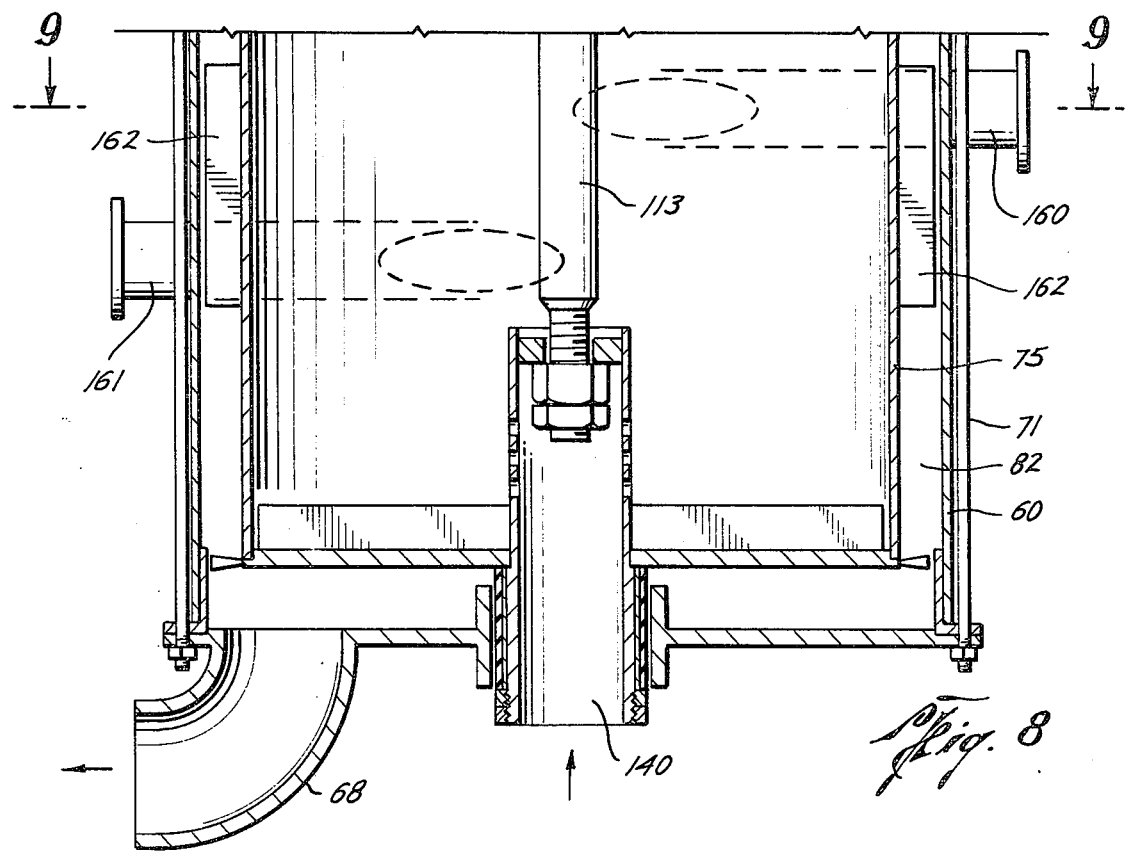
FIG. 8 is a partial elevation of the form in FIG. 9.
Figure 9:
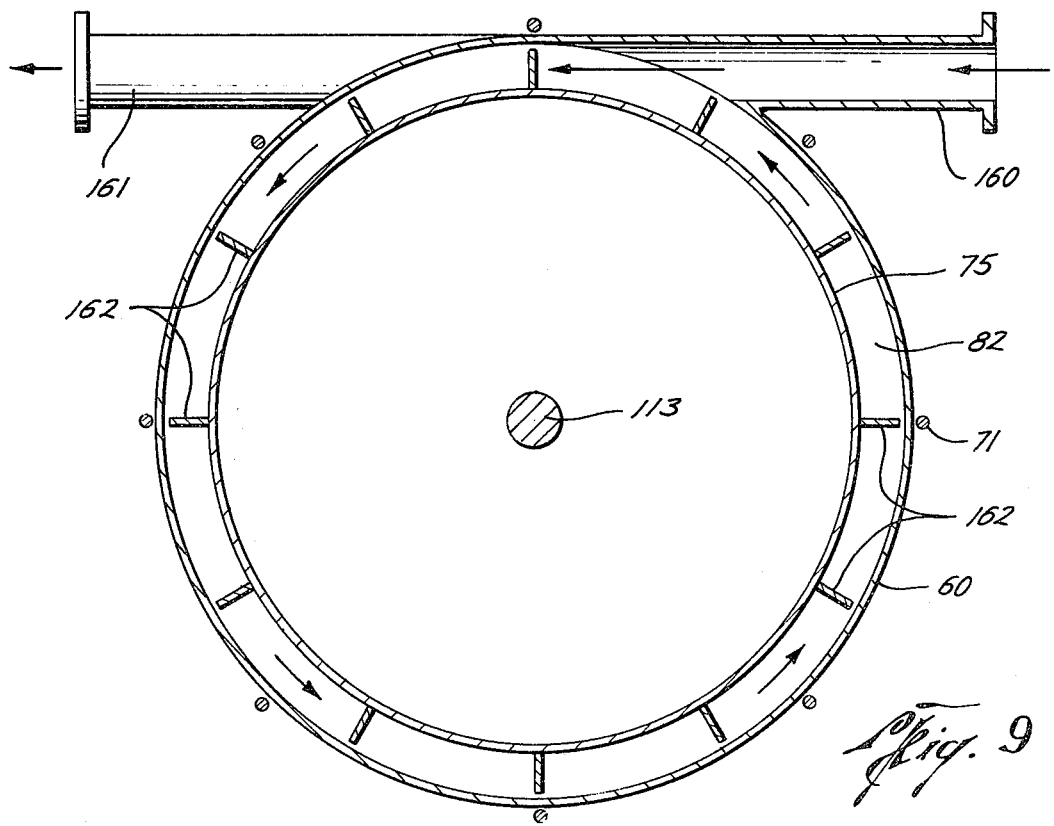
FIG. 9 is a section taken on line 9—9 of FIG. 8.

FIGS. 8 and 9 illustrate a primary gas release feature which is particularly useful in case there should be a "gas kick," that is, in case there should be such an increase of pressure in the well as to cause the blowout preventer to close diverting the well fluid through the choke manifold leading from the preventer. The line from the choke manifold is shown at 160 connecting tangentially with casing 71 so as to direct the heavily gas cut well fluid around the annulus 82 between the casing and rotary body 75. The released gas tends to remain in the inner portion of the annulus and to rise therein and pass through vent holes 99 into the surmounting suction pump. The liquid and solid constituents cling centrifugally to the casing wall, descending somwhat in passing about the annulus and emerging through tangential pipe 161 leading to a flare stack or other region. Some of the energy of the well fluid stream is applied to ribs 162, projecting outwardly from the rotor body turbine fashion, to assist in rotating the body.

The form in FIGS. 6 and 7 substantially shortens the rotor body and therefore the unit. The shortened rotor body 145 has degassed mud discharge openings 146 in its lower corners, instead of at the top, as previously. Mud inlet pipe 147, 148, casing 149, and stacked centrifugal blowers 150, 151, etc., are generally similar to corresponding parts in previous forms. The impeller blades terminate at their inner ends in somewhat thicker hub rings 152 which are secured against rotation on drive shaft 153 by a long, circular section key 154. FIG. 6 shows impeller ribs 155 extending tangentially from impeller hub ring 152.

To compensate for the shallowness of rotor body 145, inlet pipe 147 and discharge pipe 156 are of such length in relation to the height of the inlets 157 relative to the mud surface, the density of the mud, and the suction produced by the stacked blowers, that the mud can not be lifted into the blowers.

OPERATION

All forms of the invention operate similarly in general. In FIG. 1, the unit is supported by the flotation collar to maintain inlet 29 immersed to the proper depth in the gas-cut mud. In FIG. 4, inlet pipe 31 will be connected to a pond or tank of contaminated mud. In FIGS. 5 and 7, the degasser unit will be supported in any suitable manner. Contaminated mud enters the bottom of bell-like casing 12 (FIG. 1), or inlet pipe 13a (FIG. 4) or 63 (FIG. 5), or 147 (FIG. 7), whence it is drawn into the rotor body by the pressure head of the liquid, and/or the suction developed by rotation of the rotor body as well as the suction pump. In FIG. 1 the mud enters through rotor inlet 29 and is dispersed in a thin sheet laterally toward rotor wall 36. Some gas is released exteriorly of the rotor and travels upwardly through the casing and neck 16 to toroid 17 and gas exit 23. The remainder of the gas released from inlet 32, 33 is drawn into tube 25 and thence into impeller 22 and exit 23.

The purged mud and other heavier components are thrown centrifugally against and upwardly along rotor wall 36, as indicated by the arrows 54. Sand, being heavier than the mud, clings to wall 36 and exits through vents 37 and pipe 40. The sand tends to hold the mud away from wall 36 and vents 37 so that the mud travels to upper vents 45.

In the form of FIG. 4, the contaminated fluid enters the casing through pipe 13a and is sucked into the rotor body, as before. All liquid and solid materials egress through the single row of vents 52.

The forms of FIGS. 5 and 7 are intended either to be supported partly immersed, as on a flotation collar, or mounted on a platform with inlet 63 and outlet 68 connected respectively, to a gas-cut and a clean mud pond or tank. In FIG. 5, the mud is driven outwardly and upwardly, as before, by centrifugal force as well as the depression in the rotor. Only sufficient suction will be supplied by the multi-stage blowers to release and extract gas from the gas-cut mud in the rotor body, while avoiding back-flow into the rotor through inlets 93. The degassed mud will discharge through openings 84, preferably striking the casing wall for additional gas separation, then flowing downwardly through annulus 82. At the bottom of the annulus, the mud will be given impetus by axial flow vanes 81 and, ultimately, will egress through passage 68. Gases released in annulus 82 may pass upwardly through vents 99 into the suction pump. Finally, the gases will exit at the top through outlet 129.

In case of a well "kick (FIGS. 8 and 9)," well fluids diverted through line 16 from the blowout preventer will be directed tangentially into annulus 82, where it will be centrifuged and expanded causing release of the gas into the suction pump, the action of which will be aided by the turbine action of the high pressure well fluid on vanes 162.

In the FIG. 7 form, the mud will rise in the rotor near the level of the suction inlet ports 157 leading to the blowers, the elevation of these ports above the external gas-cut mud level preventing drawing of the mud into the blowers. The degassed mud will exit laterally through lower peripheral holes 146 and downwardly through discharge pipe 156.

The novel degasser, as indicated previously, has many advantages over conventional degassers now in use. For instance, where the unit is immersed in the contaminated mud tank or pond itself, no additional piping is needed for conducting the contaminated mud to the degasser. The provision of the rotating separator body provides for constant stirring of the mud which prevents caking on the apparatus with the necessity of frequent cleaning. The device in an exemplary form weighs in the neighborhood of 500 lbs., whereas a conventional degasser apparatus as now in use may weigh as much as 6,000 lbs. The device has only one moving part, whereas conventional devices usually embody a vacuum pump, a mud transporting pump, floats, and switches. Nevertheless, the device has greater separating power than conventional devices, for instance, using drainage over descending vanes. Because of its small bulk, the device is readily transportable and adapted for mounting on any existing mud system. The flotation collar insures uniform positioning of the apparatus with respect to the mud liquid level for uniform action as the mud level drops or rises. Finally, the incorporation of the desanding ports, as in FIGS. 1 and 5, permits the elimination of another bulky unit which may run as high as 6,000 lbs. in weight.

Any suitable type of suction pump may be used and the drive motor may be variously mounted. These and other modifications may be made as will occur to those skilled in the art, and the exclusive use of all such modifications as occur to those skilled in the art and as covered by the appended claims is contemplated.

I claim:

1. A degasser apparatus comprising a casing, a hollow (motor) rotor body rotatably mounted in said casing and having a fluid inlet and first and second fluid outlets, respectively, in inner and outer parts of said body, power means for rotating said body to draw fluid into said body and to discharge lighter and heavier constituents of said fluid, respectively, through said outlets by centrifugal action, and suction means connected to said first outlet for assisting in separation of said lighter from said heavier constituents, said suction means comprising a pump mounted on said casing and communicating with said first outlet.

2. A degasser apparatus as described in claim 1 in which said power means is mounted on said suction pump and jointly actuates said pump and said rotor body.

3. A degasser apparatus as described in claim 2 in which said suction pump has an impeller connected to said rotor body for joint rotation therewith.

4. A degasser apparatus as described in claim 3 in which said suction pump and said power means are mounted serially above said casing and said pump impeller and rotor body comprise a rigidly connected unit.

5. A degasser as described in claim 1 in which said casing has a top wall and said suction pump includes a housing with its bottom wall forming at least part of said casing top wall, and a centrifugal impeller in said housing, said first outlet means being formed in said wall part.

6. A degasser as described in claim 1 in which said second outlet means includes a plurality of ports located at different distances from said inlet for further separation by centrifugal action of heavier constituents of said fluid.

7. A degasser as described in claim 1 further including a chamber between said casing and said rotor body with first and second outlet passages, respectively, at different distances above the bottom of said rotor body for, respectively, discharging lighter and heavier constituents of said fluid passing through said chamber.

8. A degasser as described in claim 7 in which said second outlet passage means in said rotor body comprises one or more ports disposed to cause the fluid to impact against a confronting wall of said casing for additional separating action.

9. A degasser as described in claim 7 further including pump impeller means on the outside of said rotor body for impelling the fluid in said chamber and assisting in the separation of the fluid constituents.

10. A degassing apparatus as described in claim 1 in which said fluid inlet is an opening in the bottom of said rotor body for admitting fluid adjacent said casing into said body.

11. A degasser apparatus as described in claim 2 further including buoyant structure disposed for supporting said casing in a body of liquid at a predetermined level therein.

12. A degasser apparatus for gas-cut drilling mud comprising
  a. a casing having a conditioned mud outlet at its lower portion,
  b. a hollow rotor body rotatably supported in said casing and forming an annular chamber between the same and said casing with a gas outlet at its top, said body having a gas-cut mud inlet in its lower part and gas outlet and conditioned mud outlet means at its top, said outlet means being at different distances from said inlet,
  c. a suction pump mounted on said casing and with its inlet communicating with said gas outlet means, the impeller of said pump being rigidly connected to said rotor body, and
  d. a motor mounted on said suction pump for rotating said impeller and said rotor body as a unit to draw gas-cut mud into said body and separate the gas and nongaseous constitutents of the mud by centrifugal action for discharge, respectively, through said gas and conditioned mud outlet means.

13. A degasser apparatus for gas and liquid mixture comprising a gas and liquid separating body, flotation means incorporated with said body and adapted to support said body in substantially uniform relationship with respect to the free surface of a body of the mixture.

14. A degasser as described in claim 13 in which said flotation means comprises a bouyant structure mounting said separating body.

15. A degasser as described in claim 13 further including means for anchoring said apparatus in said body of mixture while permitting rise and fall of the apparatus with said surface.

16. A degasser apparatus comprising a casing having a top wall, a hollow rotor body rotatably mounted in said casing and having a bottom inlet for gas-cut fluid and upper outlet means, suction pump means comprising a plurality of centrifugal pump housings and enclosed impellers serially superposed on said casing top wall with the inlet of each housing connected to the next upstream pump outlet and the inlet of the first of the series connected to the interior of said rotor body, shaft means connecting all of said impellers and said rotor body for joint actuation thereof, and motor means mounted on the last of said housings in the series and opertively connected to said shaft means.

17. A degasser device comprising a casing having an inlet for gas-cut fluid, a hollow body rotatably mounted in said casing, a blower mounted on said casing with an impeller a toroidal housing and an inlet communicating with the interior of said body for applying suction thereto, said body having an inlet opening in its lower part for gas-cut fluid and outlet means at its periphery, a drive shaft jointly connecting said blower and said hollow body, and power means operatively connected to said shaft for rotating said impeller and said body as a unit for acting on the fluid centrifugally and by suction to draw gas-cut liquid through said inlet opening and discharge the same through said outlet means, while separating gas from said fluid.

18. A degasser device as described in claim 17 in which said casing is adapted for submergence in a body of gas-cut liquid and further including a hollow neck connecting said inlet and said casing for supporting said toroidal housing above the level of the casing enveloping liquid.

19. A degasser device as described in claim 17 in which the inlet opening in said rotor body is provided with a laterally disposed shelf part within said body and a sharp-edged ledge on said part projected transversely from said shelf part so as to be traversed by liquid entering said inlet opening to thereby assist release of gas from the liquid.

20. A degasser device as described in claim 17 further including a motor mounted on said blower housing and connected to said shaft for rotating said impeller and said rotor body as a unit.

21. A degasser device as described in claim 17 in which said body has a bottom incorporating said inlet opening, the wall of said body extending upwardly from said bottom so as to facilitate upward travel of material separated from the liquid in said body.

22. A drilling mud degasser apparatus as described in claim 17 further including a flotation member for supporting said casing uniformly submerged in a pool of drilling mud.

23. A drilling mud degasser device as described in claim 17 further including a sand catching ring surrounding said casing abreast of said outlet means and conduit means for disposing of sand collected by said ring.

24. A degasser device as described in claim 21 in which said outlet means comprises first and second outlet openings in the wall of said body, said first outlet opening being located at a greater distance from said inlet than said second outlet opening whereby heavier material separated from the liquid in said body will tend to travel up said body wall and escape through said second opening, while lighter separated material travelling up said wall will tend to be held away from said wall and said second opening by said heavier material so as to escape through said first outlet opening.

25. A drilling mud degasser apparatus as described in claim 22 in which said flotation member comprises a buoyant collar surrounding said casing and duct means extending through said collar for carrying away said sand discharged through said openings.

26. A drilling mud degasser apparatus as described in claim 25 in combination with a tank for accumulating gas-cut drilling mud in which said casing is submerged, and stabilizing arm means pivotally connecting the tank wall and said apparatus.

27. The method of separating gas and liquid comprising the steps of directing the liquid into the lower part of a hollow rotor body and over a sharp edge therein, rotating the body to centrifugally discharge solid and/or liquid components outwardly, and applying suction to the interior of the body for releasing gases from the liquid and discharging released gases.

28. A degasser apparatus comprising a hollow separator body having lower and upper openings, respectively, for admitting gas-cut liquid into said body and for discharging gas and purged liquid therefrom, and flotation means for supporting said hollow body in a container of gas-cut liquid having a free surface with said lower opening substantially uniformly immersed with respect to said free surface.

29. A degasser apparatus as described in claim 28 further including means movably anchoring the apparatus to the container.

30. A degasser apparatus as described in claim 29 in which said latter means comprises an arm pivotally connecting the apparatus to said container.

* * * * *